US009366113B2

(12) United States Patent
Etschel et al.

(10) Patent No.: US 9,366,113 B2
(45) Date of Patent: Jun. 14, 2016

(54) DEVELOPMENT AND REHABILITATION OF WELLS AND SPRINGS BY A ROTARY NOZZLE DEVICE WITH ANGLE ADJUSTABLE NOZZLES

(71) Applicant: EM Holding GmbH & Co. KG, Planegg (DE)

(72) Inventors: Rainer Etschel, Hof (DE); Gerhard Etschel, Planegg (DE)

(73) Assignee: EM HOLDING GMBH & COKG (DE)

( * ) Notice: Subject to any disclaimer, the term of this patent is extended or adjusted under 35 U.S.C. 154(b) by 201 days.

(21) Appl. No.: 14/050,754

(22) Filed: Oct. 10, 2013

(65) Prior Publication Data
US 2014/0231546 A1    Aug. 21, 2014

(30) Foreign Application Priority Data

Feb. 20, 2013 (EP) ..................... 13155953

(51) Int. Cl.
| B05B 3/06 | (2006.01) |
| E21B 37/06 | (2006.01) |
| B05B 15/06 | (2006.01) |
| B05B 3/02 | (2006.01) |
| B05B 1/14 | (2006.01) |
| B08B 9/043 | (2006.01) |
| B08B 9/093 | (2006.01) |
| A01M 7/00 | (2006.01) |
| E21B 21/00 | (2006.01) |
| E21B 41/00 | (2006.01) |
| E21B 37/00 | (2006.01) |
| E21B 37/08 | (2006.01) |

(52) U.S. Cl.
CPC ............... *E21B 37/06* (2013.01); *A01M 7/005* (2013.01); *B05B 1/14* (2013.01); *B05B 3/02* (2013.01); *B05B 3/025* (2013.01); *B05B 3/06* (2013.01); *B05B 15/067* (2013.01); *B05B 15/069* (2013.01); *B08B 9/0433* (2013.01); *B08B 9/0936* (2013.01); *E21B 21/00* (2013.01); *E21B 37/00* (2013.01); *E21B 37/08* (2013.01); *E21B 41/0078* (2013.01); *Y10T 29/494* (2015.01)

(58) Field of Classification Search
CPC ............ B05B 3/02; B05B 3/025; B05B 3/06; B05B 15/069; B05B 15/066; B05B 15/067; B05B 1/14; B08B 9/0936; B08B 9/0433; A01M 7/005; E21B 37/00; E21B 21/00; E21B 41/0078; E21B 37/06; E21B 37/08; Y10T 29/494
USPC .......... 239/7, 225.1, 248, 251, 258, 261, 536, 239/550, 554, 556, 587.1, 587.4, 587.5; 166/223, 312; 134/167 C, 167 R
See application file for complete search history.

(56) References Cited

U.S. PATENT DOCUMENTS

| RE31,495 E | * | 1/1984 | Zublin | .................... E21B 37/00 239/550 |
| 5,697,442 A | * | 12/1997 | Baldridge | ............... E21B 21/10 166/312 |
| 5,765,756 A | * | 6/1998 | Jordan | .................. B05B 15/067 166/223 |
| 6,840,315 B2 | * | 1/2005 | Jarchau | ............... E21B 41/0078 239/251 |
| 8,312,930 B1 | | 11/2012 | Glass | |

* cited by examiner

*Primary Examiner* — Steven J Ganey

(57) ABSTRACT

A rotary nozzle device (1) for development and rehabilitation of wells (3) is presented. The rotary nozzle device (1) comprises a body (5) with a longitudinal axis (7), a first group (9) of nozzles (23, 25) and a second group (11) of nozzles (27, 29). The body (5) is adapted for being inserted into a well shaft (37) and for supplying a rehabilitating or developing medium (13) to the nozzles (23, 25, 27, 29). The first group (9) of nozzles (23, 25) is arranged at a first distance (15) along the longitudinal axis (7) to the second group (11) of nozzles (27, 29). Therein, at least one nozzle (23, 25, 27, 29) is adjustable in such a way that the angle (a) between the nozzle (23, 25, 27, 29) and the longitudinal axis (7) is variable.

11 Claims, 2 Drawing Sheets

DEVELOPMENT AND REHABILITATION OF WELLS AND SPRINGS BY A ROTARY NOZZLE DEVICE WITH ANGLE ADJUSTABLE NOZZLES

TECHNICAL FIELD OF THE INVENTION

The invention relates to a rotary nozzle device for development and rehabilitation of wells and springs. Furthermore, the invention relates to the use of such rotary nozzle 20 device for the development and rehabilitation of wells. Moreover, the invention relates to a method for producing such a rotary nozzle device.

BACKGROUND OF THE INVENTION

A well or spring, particularly a deep well, comprises a vertical, inclined or horizontal well shaft and a tube with perforations. Between the well shaft and the tube natural or artificial filter gravel is arranged. The water which is present in the soil around the well shaft flows through the well shaft, the filter gravel and the perforations in the tube into the well. The water from the well may be supplied to a water supply network.

The water entering through the well shaft carries particles and sediments and or chemical and bacteriological solids. When passing the filter gravel the water is filtered and the particles and sediments etc. accumulate in the filter gravel. The resulting film or layer of sediment in the filter gravel and on the tube walls and on the borehole wall reduces the efficiency of the well. Thus, this film of sediments has to be removed.

Known devices for cleaning wells comprise a body on which nozzles are arranged in a plane. The body is inserted into the well and the nozzles are supplied with a fluid under high pressure. The fluid enters the area of the filter gravel through the perforations in the tube. Due to the high pressure the sediments are removed from the filter gravel and flow into the well together with the fluid. An electrical or engine driven motor may drive the nozzles to rotate around the body.

However, the known devices may have a complicated layout. Furthermore, the known devices have to be manually adjusted for the requirements of the particular well.

SUMMARY OF THE INVENTION

Thus, there may be a need for an improved device for development and rehabilitation of wells and a corresponding method for producing such device, which in particular is enhanced in its efficiency and is less complex compared to the known devices.

This need may be met by the subject-matter of the independent claims. Advantageous embodiments of the present invention are described in the dependent claims. In the following possible features and advantages of the device will be explained in detail.

According to a first aspect of the present invention a rotary nozzle device for development and rehabilitation of wells is proposed. The rotary nozzle device comprises a body with a longitudinal axis, a first group of nozzles and a second group of nozzles. The body is adapted for being inserted into a well shaft and for supplying a rehabilitating medium to the nozzles. Therein, the first group of nozzles is arranged at a first distance along the longitudinal axis to the second group of nozzles. At least one nozzle is adjustable in such a way that the angle between the nozzle and the longitudinal axis is variable.

In other words, the first aspect of the present invention may be seen as based on the idea to arrange the nozzles in two planes arranged at a distance along the longitudinal axis and at the same time to design the nozzles such that the inclination of the nozzle openings is variable. In this way the efficiency of the rotary nozzle device is enhanced because due to the arrangement of two nozzle groups at a distance to each other a greater volume or surface of the well may be cleaned during the same time period. Furthermore, the inclination of one or preferably of each nozzle is variable. Thus, the rotary nozzle device may be adapted to the requirements of the respective well without the necessity of disassembling the device. Particularly, the rotary nozzle device may be adapted for different grain sizes of the filter gravel and for different layouts, materials and sizes of the perforated and non perforated tubes of the well.

Moreover, the variability of the angle between the nozzle and the longitudinal axis allows the rehabilitating medium to be ejected at a desired angel. Thus, the direction of high pressure impulses produced by the rehabilitating medium in the well water may be varied. For example, if a region with a particularly persistent layer of sediments is detected both groups of nozzles may be directed at this layer. Moreover, also by varying the inclination of the nozzles a greater or smaller volume or surface of the well may be covered during the same period of time. Thus, the well may be cleaned, developed or rehabilitated faster and more efficient.

The rotary nozzle device may be employed for development and rehabilitation of any kind of wells. Therein, a well may be a source of water, e.g. groundwater. The well may be arranged horizontally or vertically in the ground.

The medium supplied to the nozzles may be a rehabilitating medium or a developing medium. A developing medium may be the same medium as the rehabilitating medium, e.g. water. Alternatively, the rehabilitating medium may differ from the developing medium.

The rotary nozzle device comprises a body, which may also be denoted as assembly body. When the body is inserted into the well shaft the longitudinal axis of the body may be in parallel to the longitudinal axis of the well. Particularly, the body may be inserted into the tube with perforations arranged within the well shaft. The well shaft may also be denoted as borehole and the tube may also be denoted as casing. The perforated part of the tube may be denoted as well screen.

The body may comprise a feed conduit for directing the rehabilitating or developing medium to the nozzles. The rehabilitating or developing medium may be supplied under pressure to the nozzles. Therein, the rehabilitating or developing medium may for example be a fluid such as water or alternatively a solution of chemicals for removing sediments and breaking up chemical and bacteriological incrustations. The rehabilitating or developing medium may be supplied from a medium source outside the well. Alternatively, the regenerating or developing medium may be water pumped from the well above the working area of the rotary nozzle device.

The first group of nozzles and the second group of nozzles may each comprise at least two nozzles. Particularly, the first group of nozzles and the second group of nozzles may for example comprise the same number of nozzles or a different number of nozzles. In this case the nozzles of the first group may be arranged opposite each other. I.e. at 180° from each other around the body. If the first group of nozzles comprises a number n of nozzles than they may be arranged at a distance of 360°/n with respect to each other. The same applies for the second group of nozzles.

The nozzles may also be denoted as spray jet nozzles or high-pressure nozzles. Therein, each nozzle may be a pipe or tube of varying cross sectional area. An opening of the nozzle at which the developing or rehabilitating medium is ejected may have a diameter e.g. between 0.1 mm and 3 mm. Particularly, the diameter of the opening may be 0.5 mm. The nozzles may allow for a delivery volume of 0.5 to 0.9 liter per second. Furthermore, the nozzles may be designed to promote turbulent flow and thus to allow the creation of high pressure impulses by the rotary nozzle device.

The nozzles are employed to control the direction, speed and pressure of the developing or rehabilitating medium. The nozzles of the first nozzle group may be connected to a first bearing on the body. The nozzles of the second nozzle group may be connected to a second bearing on the body. The first and second bearings may rotate about the longitudinal axis of the body. Furthermore, a nozzle arm may connect a nozzle to the body or to the bearing. Therein, the nozzle arm may be rigidly connected to the bearing, while the nozzle may vary its inclination with respect to the longitudinal axis.

The first group of nozzles and the second group of nozzles may rotate about the longitudinal axis at up to 10000 revolutions per minute. The first group of nozzles, i.e. the first bearing is mounted to the body at a first level or at a first height of the body. The second group of nozzles, i.e. the second bearing is mounted to the body at a second level or at a second height of the body. Thus, the first group and the second group of nozzles are separated from each other by a first distance. The first distance may be variable for example it may be between 5 cm and 20 cm.

At least one of the nozzles and preferably all nozzles are mounted to the body, to the bearing or to the nozzle arm in such a way that the angle between the nozzle opening and the longitudinal axis of the body is variable. In other words, the angle between a plane perpendicular to the longitudinal axis and the beam of developing or rehabilitating medium is variable. Particularly, the angel is variable continuously, i.e. steplessly.

The first and second groups of nozzles are arranged in a working space on the body. The working space is defined between two sealing elements which may for example be inflated when the body is inserted into the well and the groups of nozzles are brought into the required position.

According to an embodiment of the invention the first group of nozzles and the second group of nozzles are mounted in such a way on the body that they rotate in opposite directions. E.g. the first group of nozzles may rotate clockwise around the body, while the second group of nozzles may rotate counter clockwise around the body (or vice versa). In this way the torque acting on the body is reduced or extinguished even for high rotational speeds up to 10.000 revolutions per minute. Therein, the rotational speed may depend on the diameter of the well or of the diameter of the tube. The greater the diameter the smaller the rotational speed may be due to friction losses. The delivery rate of the rehabilitating or developing medium is independent from the number of nozzles present at the rotary nozzles device. The higher the pressure, the higher the delivery rate and thus also the higher the rotational speed.

According to a further embodiment of the invention the rotation of the nozzles is driven by the rehabilitating or developing medium supplied to the nozzles. I.e. the nozzles are arranged and orientated in such a manner on the body that the nozzles start to rotate as soon as the rehabilitating medium or the developing medium is supplied to the nozzles at a certain pressure. This may for example be due to a recoil effect. For example, the recoil effect may occur if the nozzles enclose with the tube an angel differing from 90°. The rotation of the nozzles may be caused and driven only by the rehabilitating or developing medium.

The use of the developing or rehabilitating fluid supplied to the nozzles as a driving force may make an engine driven or electric motor dispensable and thus simplify the design of the rotary nozzle device. Furthermore, it may help in reducing the consumption of energy.

According to a further embodiment of the invention at least one nozzle is adjustable in such a way that the orientation of the nozzle in a plane perpendicular to the longitudinal axis of the body is variable. In other words, in addition to the adjustability of the nozzle in a vertical direction the nozzle is also adjustable in a horizontal direction. Thus, the orientation of the nozzle may be adjustable in three dimensions. The adjusting of the orientation of the nozzle in the plane perpendicular to the longitudinal axis may enhance the rotation of the nozzles caused by the rehabilitating or developing medium.

According to a further embodiment of the invention the rotary nozzle device is adapted to develop and/or rehabilitate wells by providing high pressure impulses via the rehabilitating or developing medium into the well to be developed and/or rehabilitated. The High pressure impulses may also be denoted as pulsating pressure waves. The high pressure impulses are provided through the nozzles to the water in the well and propagate through the perforations in the tube into the filter gravel and beyond into the aquifer and possibly into the surrounding rock mass. Moreover, the rotary nozzle device is adapted for developing and rehabilitating wells even in areas where no perforations in the tube of the well are present. This is possible because the high pressure impulses may also propagate through the tube without perforations.

The high pressure impulses cause the sediments and particles to separate from the tube wall, from the filter gravel and the well shaft wall. The high pressure impulses may also lead to cavitation which may be useful when destroying bacteria resulting from the settlements. The pressure at which the high pressure impulses are provided may depend on the size of the nozzle outlets and the length of the high pressure hose. For example, the pressure may be about or greater than 270 bar at the nozzles to create high pressure impulses.

According to a further embodiment of the invention a joint is arranged between the body and at least one of the nozzles. Preferably, a joint is arranged respectively between each of the nozzles and the body. The joint makes possible the adjusting of the orientation and/or inclination of the nozzles. The joint may be arranged between a nozzle and a nozzle arm. Alternatively, the nozzle may be rigidly connected to the nozzle arm and the joint may be arranged between the body and the nozzle arm.

According to a further embodiment of the invention the joint is a spherical joint. The spherical joint may also be denoted as a ball joint. A spherical joint may allow for an adjusting of the orientation of a nozzle in three dimensions.

According to a further embodiment of the invention the rotary nozzle device further comprises a nozzle arm which is arranged between the body and at least one of the nozzles. Therein, the joint is arranged between the body and the nozzle arm. Alternatively, the nozzle arm is arranged between the body and the joint. Different length of nozzle arms may be used for different wells e.g. depending on the diameter of the well. In a preferred embodiment the rotary nozzle device comprises four nozzles and four nozzle arms. For example, the first group of nozzles comprises two nozzles each connected to a nozzle arm. The second group of nozzles may also comprise two nozzles each connected to a nozzle arm. The length of the nozzle arm may be selected in such a way that a rotation of the nozzles is caused due to the rehabilitating or developing medium. For example, the length of the nozzle arm may be chosen such that the nozzles are spaced from the wall of the tube of the well by 20 to 30 mm.

According to a further embodiment of the invention the first group of nozzles and the second group of nozzles are designed in such a way that they provide a negative pressure during rotation around their respective curve of rotation. Particularly, the negative pressure may be provided by the rotational movement of the nozzles. The negative pressure may be employed advantageously for extracting into the well the sediments and particles removed from the perforated or non perforated tube, the filter gravel and the well shaft wall.

Additionally, a pump may be arranged above the nozzles i.e. above a working region of the rotary nozzle device. The pump may extract by suction the removed and solved particles and sediments from the working area.

According to a further embodiment of the invention the first group of nozzles comprises a first nozzle and a second nozzle and the second group of nozzles comprises a third nozzle and a forth nozzle. Therein, the first nozzle is mounted to the body opposite the second nozzle in a first plane perpendicular to the longitudinal axis and the third nozzle is mounted to the body opposite the forth nozzle in a second plane perpendicular to the longitudinal axis.

In other words, according to this embodiment the rotary nozzle device comprises two pairs of nozzles. The first pair is arranged in a first plane, for example at a first bearing. The first nozzle is arranged opposite, i.e. at 180° with respect to the second nozzle. The second pair of nozzles is arranged in a second plane, for example at a second bearing. The third nozzle is arranged at 180° with respect to the forth nozzle.

As mentioned above further nozzles may be included in the first and second groups of nozzles. The more nozzles are included in the first and second groups of nozzles the more efficient the nozzles may be driven by the rehabilitating or developing medium.

According to a further embodiment of the invention the first distance between the first group of nozzles and the second group of nozzles is variable. The first distance may be varied continuously. This may further help in adapting the rotary nozzle devise to the requirements of the respective well.

According to a second aspect of the invention the use of a rotary nozzle device for development and rehabilitation of wells as described above is presented.

According to a third aspect of the invention a method for producing a rotary nozzle device as described above is presented.

The method comprises the following steps: Providing a body with a longitudinal axis, which body is adapted for being inserted into a well shaft and for supplying a rehabilitating or developing medium to the nozzles; Arranging a first group of nozzles at the body; Arranging a second group of nozzles at the body at a first distance along the longitudinal axis to the second group of nozzles; Mounting at least one of the nozzles in such a way on the body that an angle between the nozzle and the longitudinal axis is variable.

It has to be noted that embodiments of the invention are described with reference to different subject-matters. In particular, some embodiments are described with reference to method type claims whereas other embodiments are described with reference to apparatus type claims. However, a person skilled in the art will gather from the above and the following description that, unless otherwise mentioned, in addition to any combination of features belonging to one type of subject-matter also any combination between features relating to the different subject-matters, in particular between features of the apparatus type claims and features of the method type claims, is considered to be disclosed with this application. The invention will be described in more detail hereinafter with reference to examples of embodiments but to which the invention is not limited.

BRIEF DESCRIPTION OF THE DRAWINGS

The illustration in the drawings is schematically only. It is noted that in different figures, similar or identical elements are provided with the same reference signs.

DETAILED DESCRIPTION OF EMBODIMENTS OF THE INVENTION

Figure 1:
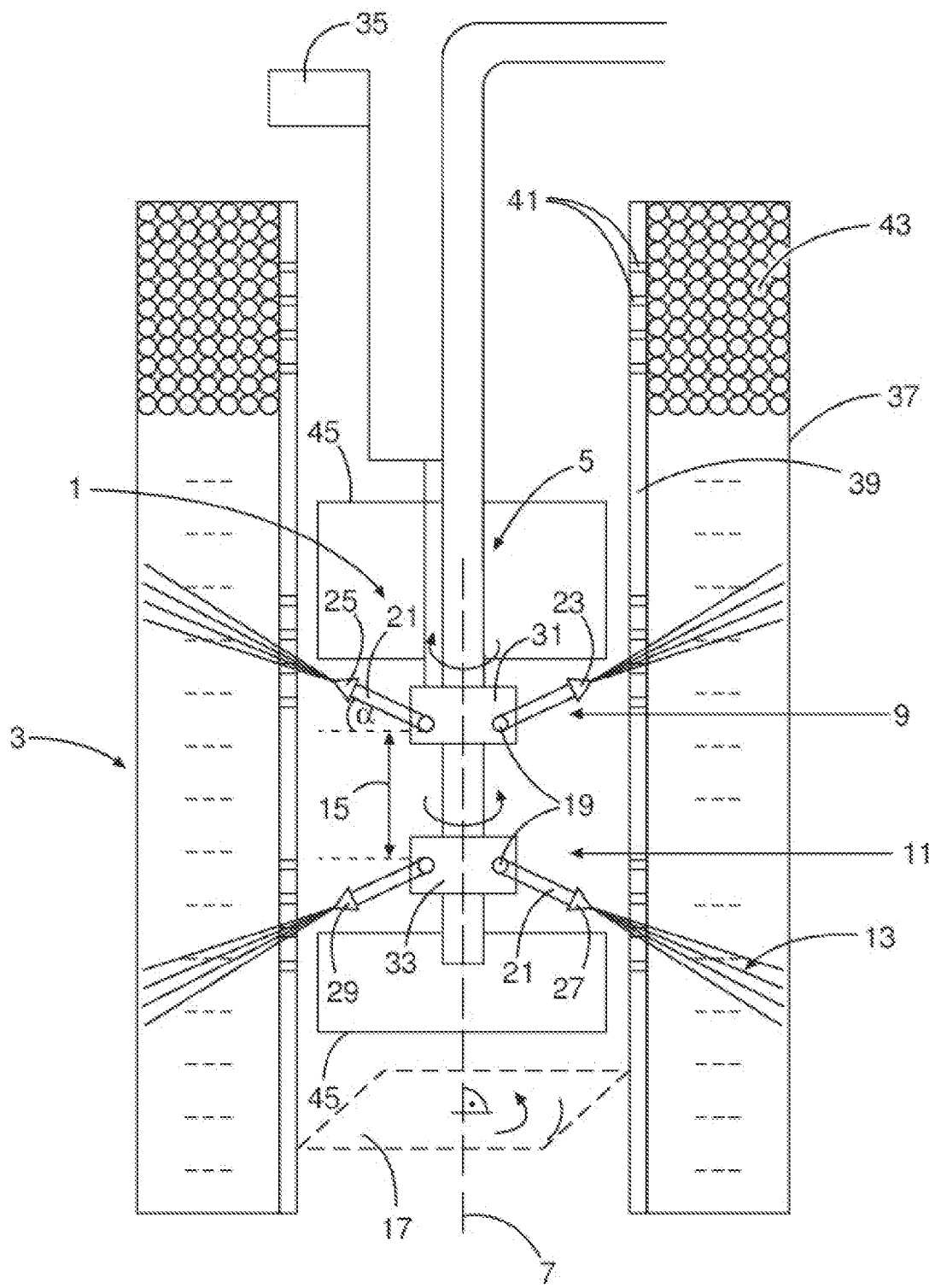
FIG. 1 shows a cross section of a well with a rotary nozzle device according to an embodiment of the invention inserted into the well.

In FIG. 1 a well 3 with a rotary nozzle device 1 inserted into the well 3 is shown. The well 3 comprises a well shaft 37 and a tube 39 with perforations 41. After the well shaft 37 is bored the tube 39 is inserted into the well shaft 37 and the space between the well shaft 37 and the outer wall of the tube 39 is filled with filter gravel 43. The filter gravel 43 may be natural or artificial gravel. Additionally or alternatively, the space may be filled with glass beads.

The ground water flows from the soil into the well shaft 37. In the well shaft 37 the water is filtered by the filter gravel 43 such that sediments and particles partially may remain in the layer of filter gravel 43. Then, the filtered water flows through the perforations 41 in the tube 39.

For retrieving the layer of sediments and particles from the filter gravel 43 and from the walls of the tube 39 and from the borehole wall, produced during the construction or operation of the well, the rotary nozzle device 1 according to the invention is provided. The rotary nozzle device 1 may be inserted into the well 3 such that a longitudinal axis of the rotary nozzle device 1 is in parallel to a longitudinal axis of the tube 39 or of the well 3.

The rotary nozzle device 1 comprises a body 5 with the longitudinal axis 7. Furthermore, it comprises a first group of nozzles 9 and a second group of nozzles 11. When inserted into the well shaft 37, the body 5 supplies a regenerating medium 13 to the nozzles 23, 25, 27, 29 through a conduit. The supply of the rehabilitating or developing medium 13 may be controlled by a control device 35. Furthermore, the rehabilitating or developing medium 13 may be water from a well or other source and/or a solution with chemicals for dissolving the sediments and particles from the filter gravel 43. The rehabilitating or developing medium 13 may be supplied to the nozzles in high pressure pulses which propagate through the water in the well 3 to the filter gravel 43. The amount of the rehabilitating or developing medium and the pressure and frequency of the high pressure pulses may be controlled by the control device 35. The direction of the propagation of the high pressure pulses which may also be denoted as shock waves depends on the inclination and orientation of the nozzles 23, 25, 27, 29.

The first group of nozzles 9 is arranged at a first distance 15 along the longitudinal axis 7 to the second group of nozzles 11. The first distance may be variable for adapting the rotary nozzle device for different requirements of different wells 3.

In the shown embodiment all nozzles 23, 25, 27, 29 are adjustable in such a way that the angle a between the nozzle 23, 25, 27, 29 and the longitudinal axis 7 is variable. The angle a may be denoted as a vertical angle and may be varied continuously.

The first group of nozzles 9 and the second group of nozzles 11 are designed to rotate in opposing directions. As shown by the arrows in FIG. 1 the first group of nozzles 9 rotates clockwise about the longitudinal axis 7, while the second group of nozzles 11 rotates counterclockwise about the longitudinal axis 7.

The rotation of the groups of nozzles 9, 11 is caused or driven by the rehabilitating or developing medium 13 supplied under high pressure to the nozzles 23, 25, 27, 29. Due to the counter-rotation of the groups of nozzles 9, 11 a torque acting on the components of the rotary nozzle device 1 is reduced or extinguished.

The nozzles 23, 25, 27, 29 may be mounted to the body 5 in such a way that at least one and preferably each nozzle 23, 25, 27, 29 is variable in its orientation in a plane 17 perpendicular to the longitudinal axis 7 of the body 5. I.e. the horizontal angle of the nozzles 23, 25, 27, 29 may be varied. In FIG. 1 the plane 17 is shown below the nozzles 23, 25, 27, 29. Together with the variability of the vertical angle α, the nozzles 23, 25, 27, 29 may be varied in their orientation in three dimensions. Particularly, the nozzles 23, 25, 27, 29 may be arranged at any angle and orientation at the body 5 as long as a recoil effect by the regenerating medium 13 ejected from the nozzles 23, 25, 27, 29 is provided for. The orientation of the nozzles 23, 25, 27, 29 may be controlled by the control device 35 or alternatively manually.

The efficiency of the rotary nozzle device 1 is enhanced due to the arrangement of two nozzle groups 9, 11 at a first distance 15 to each other. This distance 15 allows for a greater volume of the well 3 to be cleaned during a short time period. Furthermore, due to the variability of the inclination of the nozzles 23, 25, 27, 29 the rotary nozzle device 1 may be adapted to the requirements of the respective well 3 without the necessity of disassembling the device 1.

Particularly, the rotary nozzle device 1 may be adapted for different grain sizes of the filter gravel 43 and for different layouts and sizes of the tubes 39. In this way, the efficiency of the rotary nozzle device 1 may be enhanced by a factor 10 as compared to know devices. The separation and removing of sediments, and particularly sedimentation of bio films, iron ochre, manganese, and/or silt and sand, may be done more efficiently with the rotary nozzle device 1 according to the invention. Furthermore, the process of developing new wells 3 or of rehabilitating existing wells 3 may be more efficient because larger amounts of sand and water boring residues may be removed in a shorter time with the rotary nozzle device 1. This is due to the fact, that the first distance 15 between the groups of the nozzles 9, 11 and the angle of impact of the high pressure pulses on the tube 39 and on the filter gravel may be varied and adapted as necessary.

The variability of the inclination and orientation of the nozzles 23, 25, 27, 29 may be provided by a joint 19. The joint may be designed as a spherical joint and be arranged between the body 5 and nozzle arms 21 on which the nozzles 23, 25, 27, 29 are rigidly fixed as shown in FIG. 1. Alternatively, the joint 19 may be provided between the nozzle arm 21 and the nozzle 23, 25, 27, 29. This is not shown in the Figures.

Furthermore, between the nozzle arms 21 and the body 5 bearings 31, 33 are arranged. The bearings 31, 33 are adapted to rotate about the longitudinal axis 7. The nozzle arms 21 may be mounted directly on the bearings 31, 33 or via joints 19 as mentioned above. Therein, the first nozzle 23 and the second nozzle 25 are mounted on a first bearing 31 on opposing sides, i.e. at a distance of 180° to each other. Furthermore, the third nozzle 27 and the forth nozzle 29 are mounted at the second bearing 33 on opposing sides.

The rotary nozzle device 1 may further comprise at least one centralizer 45. In the embodiment shown in FIG. 1 two centralizers 45 are arranged in the vicinity of the nozzles 25. Particularly, a first centralizer 45 is arranged above the first bearing 31 and a second centralizer 45 is arranged below the second bearing 33. The centralizers 45 may be designed e.g. as wire frames or as a solid body.

Therein, the centralizers 45 may have a diameter which is slightly smaller than the inner diameter of the tube 39 and which is slightly bigger than the maximal extension of the nozzles 23, 25, 27, 29 in a plane 17 perpendicular to the longitudinal axis 7. The centralizers 45 guarantee that the nozzles 23, 25, 27, 29 are protected from coming into contact with the tube 39. Thus, the centralizers 45 fulfill a protecting function. Furthermore, the nozzles 23, 25, 27, 29 help in maintaining throughout the same distance between the nozzles 23, 25, 27, 29 and the tube 39 or well screen.

Figure 2:
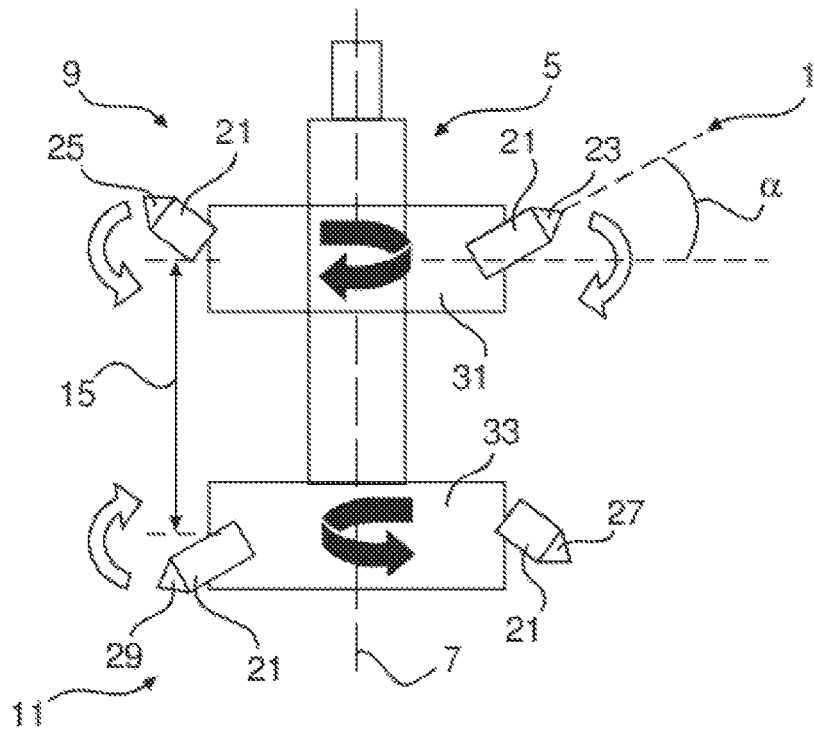
FIG. 2 shows a cross section of a rotary nozzle device according to an embodiment of the invention.

In FIG. 2 an alternative embodiment of the rotary nozzle device 1 is shown. Therein, in FIG. 2 the nozzle arms 21 are mounted directly to the bearings 31, 33, i.e. without joints 19. The design of these bearings is shown in detail in FIG. 3.

Figure 3:
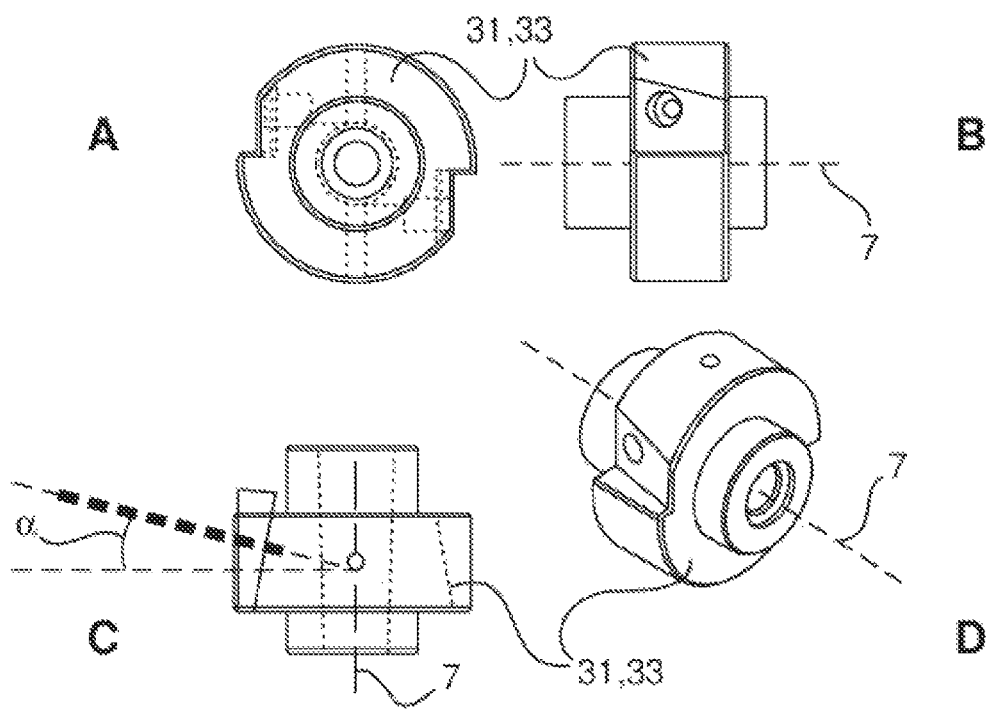
FIG. 3 shows different views of a bearing for the rotary nozzle device according to an embodiment of the invention.

In FIG. 3 different perspective views of the bearing 31, 33 are shown. FIG. 3A shows a top view of the bearing 31, 33. FIG. 3B shows a side view of the bearing 31, 33. FIG. 3C shows a cross section of the bearing 31, 33. Furthermore, FIG. 3D shows a perspective view of the bearing 31, 33. Therein, it may be seen in FIG. 3A to 3D that a slot is provided in the bearing 31, 33 for adjusting the inclination and orientation of the nozzle arms 21 and thus of the nozzles 23, 25, 27, 29.

It should be noted that the terms "comprising", "including" etc. do not exclude other elements or steps and the "a" or "an" does not exclude a plurality. Also elements described in association with different embodiments may be combined. It should also be noted that reference signs in the claims should not be construed as limiting the scope of the claims.

LIST OF REFERENCE SIGNS 1 rotary nozzle device
3 well
5 body
7 longitudinal axis
9 first group of nozzles
11 second group of nozzles
13 rehabilitating or developing medium
15 first distance
17 plane perpendicular to the longitudinal axis
19 joint
21 nozzle arm
23 first nozzle
25 second nozzle
27 third nozzle
29 forth nozzle
31 first bearing
33 second bearing
35 control device
37 well shaft
39 tube
41 perforations
43 filter gravel
45 centralizers
α angle between the nozzle and the longitudinal axis

The invention claimed is:

1. Rotary nozzle device (1) for development and rehabilitation of wells (3), the rotary nozzle device (1) comprising
a body (5) with a longitudinal axis (7);
a first group (9) of nozzles (23, 25);
a second group (11) of nozzles (27, 29);
wherein the body (5) is adapted for being inserted into a well shaft (37) and for supplying a regenerating medium (13) to the nozzles (23, 25, 27, 29);
wherein the first group (9) of nozzles (23, 25) is arranged at a first distance (15) along the longitudinal axis (7) to the second group (11) of nozzles (27, 29);
wherein the first group (9) of nozzles (23, 25) and the second group (11) of nozzles (27, 29) are mounted in such a way on the body (5) that they rotate in opposite directions;
wherein at least one nozzle (23, 25, 27, 29) from the first group of nozzles or the second group of nozzles is adjustable in such a way that the angle (a) between the nozzle (23, 25, 27, 29) and the longitudinal axis (7) is variable.

2. Rotary nozzle device (1) according to claim 1,
wherein at least one nozzle (23, 25, 27, 29) from the first group of nozzles or the second group of nozzles is adjustable in such a way that the orientation of the nozzle (23, 25, 27, 29) in a plane (17) perpendicular to the longitudinal axis (7) of the body (5) is variable.

3. Rotary nozzle device (1) according to claim 1,
wherein the rotary nozzle device (1) is adapted to develop and/or rehabilitate wells (3) by providing high pressure impulses via the rehabilitating or developing medium (13).

4. Rotary nozzle device (1) according to claim 1, wherein a joint (19) is arranged between the body (5) and at least one of the nozzles (23, 25, 27, 29).

5. Rotary nozzle device (1) according to claim 4,
wherein the joint (1) is a spherical joint.

6. Rotary nozzle device (1) according to claim 4, further comprising a nozzle arm (21) which is arranged between the body (5) and at least one of the nozzles (23, 25, 27, 29);
wherein the joint (19) is arranged between the body (5) and the nozzle arm (21).

7. Rotary nozzle device (1) according to claim 1,
wherein the first group (9) of nozzles (23, 25) and the second group (11) of nozzles (27, 29) are designed in such a way that they provide a negative pressure during rotation around their respective curve of rotation.

8. Rotary nozzle device according to claim 1,
wherein the first distance between the first group of nozzles and the second group of nozzles is variable.

9. Rotary nozzle device (1) for development and rehabilitation of wells (3), the rotary nozzle device (1) comprising
a body (5) with a longitudinal axis (7);
a first group (9) of nozzles (23, 25);
a second group (11) of nozzles (27, 29);
wherein the body (5) is adapted for being inserted into a well shaft (37) and for supplying a regenerating medium (13) to the nozzles (23, 25, 27, 29);
wherein the first group (9) of nozzles (23, 25) is arranged at a first distance (15) along the longitudinal axis (7) to the second group (11) of nozzles (27, 29);
wherein at least one nozzle (23, 25, 27, 29) from the first group of nozzles or the second group of nozzles is adjustable in such a way that the angle (a) between the nozzle (23, 25, 27, 29) and the longitudinal axis (7) is variable; and
wherein a rotation of the nozzles (23, 25, 27, 29) is driven by the rehabilitating or developing medium (13) supplied to the nozzles.

10. Rotary nozzle device (1) for development and rehabilitation of wells (3), the rotary nozzle device (1) comprising
a body (5) with a longitudinal axis (7);
a first group (9) of nozzles (23, 25);
a second group (11) of nozzles (27, 29);
wherein the body (5) is adapted for being inserted into a well shaft (37) and for supplying a regenerating medium (13) to the nozzles (23, 25, 27, 29);
wherein the first group (9) of nozzles (23, 25) is arranged at a first distance (15) along the longitudinal axis (7) to the second group (11) of nozzles (27, 29);
wherein at least one nozzle (23, 25, 27, 29) from the first group of nozzles or the second group of nozzles is adjustable in such a way that the angle (a) between the nozzle (23, 25, 27, 29) and the longitudinal axis (7) is variable;
wherein the first group (9) of nozzles (23, 25) comprises a first nozzle (23) and a second nozzle (25);
wherein the second group (11) of nozzles (27, 29) comprises a third nozzle (27) and a fourth nozzle (29); and
wherein the first nozzle (23) is mounted to the body (5) opposite the second nozzle (25) in a first plane perpendicular to the longitudinal axis (7); wherein the third nozzle (27) is mounted to the body (5) opposite the fourth nozzle (29) in a second plane perpendicular to the longitudinal axis (7).

11. Rotary nozzle device (1) for development and rehabilitation of wells (3), the rotary nozzle device (1) comprising
a body (5) with a longitudinal axis (7);
a first group (9) of nozzles (23, 25);
a second group (11) of nozzles (27, 29);
a control device (25);
wherein the body (5) is adapted for being inserted into a well shaft (37) and for supplying a regenerating medium (13) to the nozzles (23, 25, 27, 29);
wherein the first group (9) of nozzles (23, 25) is arranged at a first distance (15) along the longitudinal axis (7) to the second group (11) of nozzles (27, 29);
wherein at least one nozzle (23, 25, 27, 29) from the first group of nozzles or the second group of nozzles is adjustable in such a way that the angle (a) between the nozzle (23, 25, 27, 29) and the longitudinal axis (7) is variable;
wherein the control device (25) is adapted for adjusting the angle (a) between the nozzle (23, 25, 27, 29) and the longitudinal axis (7).

* * * * *